M. P. McLAUGHLIN.
LOCK NUT.
APPLICATION FILED NOV. 17, 1910.
985,826.
Patented Mar. 7, 1911.
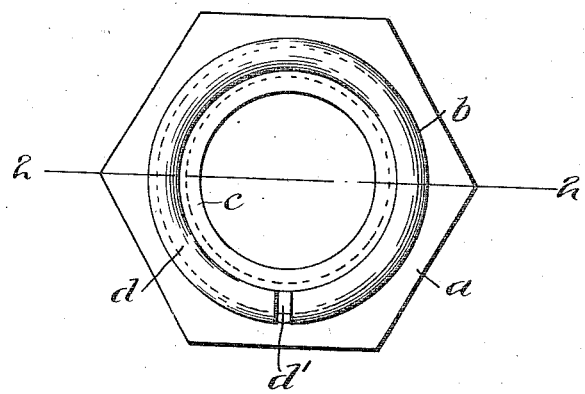
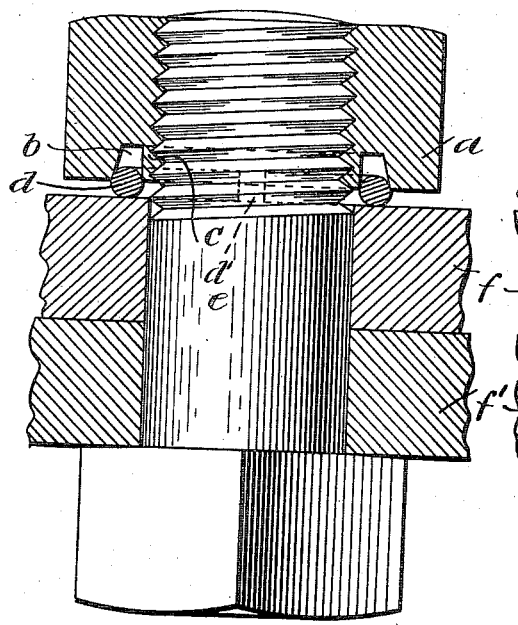
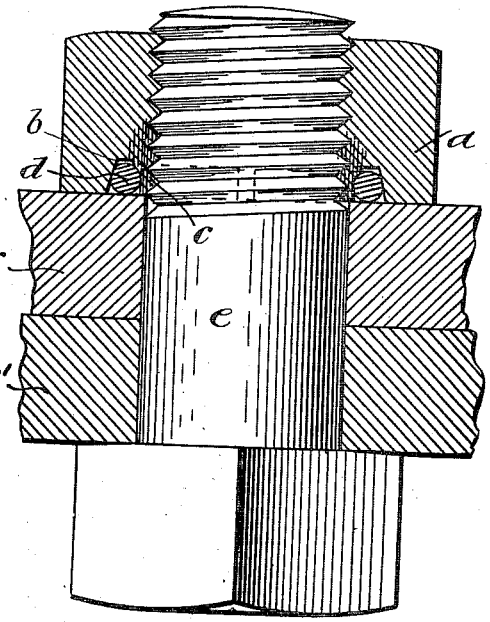

UNITED STATES PATENT OFFICE.

MILTON P. McLAUGHLIN, OF WAKEFIELD, MASSACHUSETTS.

LOCK-NUT.

985,826.

Specification of Letters Patent.   Patented Mar. 7, 1911.

Application filed November 17, 1910. Serial No. 592,821.

*To all whom it may concern:*

Be it known that I, MILTON P. McLAUGHLIN, of Wakefield, in the county of Middlesex and State of Massachusetts, have invented certain new and useful Improvements in Lock-Nuts, of which the following is a specification.

This invention has for its object to provide a simple and relatively inexpensive self-locking nut adapted to be securely engaged with the thread of a bolt by the operation of screwing the nut to place.

The invention consists in the improvements which I will now proceed to describe and claim.

Of the accompanying drawings which form a part of this specification,—Figure 1 represents a view of the inner side of a nut embodying my invention; Fig. 2 represents a section on line 2—2 of Fig. 1, showing the nut partially applied to a bolt; and Fig. 3 represents a view similar to Fig. 2 showing a nut completely applied and locked.

Similar reference characters indicate the same or similar parts in all the figures.

In the drawings, $a$ represents a nut having in its inner face a continuous annular groove $b$ surrounding and concentric with the bolt hole of the nut. The groove is formed relatively near the bolt hole so that its inner wall forms one side of a thin continuous displaceable lip $c$ which forms the inner end portion of the bolt hole, the outer wall of the groove being separated from the margin of the nut by a rigid unyielding portion of the body of the nut. The groove decreases in width from its mouth toward its bottom, the decrease in width being preferably due to the fact that the outer wall of the groove is inclined, as shown by Figs. 2 and 3.

$d$ represents a contractible ring made of cylindrical wire of greater thickness or diameter than the width of the groove between its mouth and bottom, the diameter of the wire being preferably substantially equal to or a little greater than the width of the mouth of the groove. The ring $d$ is formed to partially enter the groove, as shown by Fig. 2, that is to say, the diameter of the ring is such that when applied to the nut, as shown in Fig. 2, and brought to a bearing on the edges of the mouth of the groove, considerable of the thickness of the ring will project from the inner side of the nut. It will now be seen that when the nut is applied to a bolt $e$ inserted in parts $f$, $f'$, to be connected, the ring $d$ will at first prevent contact between the inner face of the nut and the adjacent part $f$, and that when force is applied to turn the nut inwardly the ring will gradually enter the groove. The taper of the groove from its mouth to its bottom causes a contraction of the diameter of the ring as the latter enters the groove, the ring in turn contracting the lip $c$ and causing a part of the cylindrical surface to embed itself in the lip, thus indenting the latter and not only forcing the material of the lip inwardly toward the center of the bolt hole, but also to a certain extent outwardly toward the outer face of the nut, as indicated by Fig. 3, where the vertical shade lines indicate the displacement of the metal. Portions of the surfaces of the nut thread are therefore pressed into firm, binding engagement with corresponding portions of the bolt thread, the width of the displaced and compressed zone of the metal in binding engagement with the bolt thread being greater than the depth of the groove $b$, as indicated by the shaded portion of Fig. 3. The ends of the piece of wire of which the ring $d$ is formed, are left separated from each other by a space $d'$ of sufficient width to permit a substantial contraction of the ring while it is being pressed into the groove. The contractibility of the ring enables the ring to close around practically the entire diameter of the lip $c$.

The cylindrical form of the wire of which the ring is made, reduces to a minimum the frictional resistance to the turning and locking of the nut, and therefore correspondingly reduces the power required to locate and lock the nut in its final position, the ring having a limited narrow bearing on the part $f$ and on the inclined outer wall of the groove, so that it is adapted not only to slip freely on the part $f$ when its engagement with the nut is such as to cause it to turn with the latter, but also to have a limited narrow bearing on the outer wall of the groove and therefore to enter with a correspondingly limited resistance by friction.

The ring $d$ is made of cold drawn steel or iron wire, and is therefore harder than the nut so that in entering the groove in the nut the form of the wire is practically unchanged in cross section, the displacement and compression of metal being confined mainly to the lip $c$ and the portions of the nut thread adjacent to the bottom of the groove.

It is obvious that the cost of the ring $d$, made of ordinary cold drawn wire, is inconsiderable. The same is true of the groove $b$ formed in the inner face of the nut. I have therefore produced a self-locking nut, the cost of which is not materially greater than that of an ordinary nut.

I claim,—

1. A lock nut having a continuous tapering groove in its inner side surrounding the bolt hole, the inner wall of the groove being separated from the bolt hole by a continuous displaceable lip while the outer wall is inclined and rigidly backed, and a contractible ring adapted to enter the groove and to be contracted by said inclined outer wall against said lip, the ring being formed to indent the lip and displace its material both laterally toward the center of the bolt hole and outwardly toward the outer face of the nut.

2. A lock nut having in its inner side an annular groove surrounding the threaded bolt hole of the nut, and formed relatively near the hole so that its inner wall forms one side of a continuous displaceable lip, while its outer wall is inclined and backed by the rigid unyielding body of the nut, said groove decreasing in width from its mouth toward its bottom, and a contractible ring made of cylindrical wire of greater diameter than the width of the groove between its mouth and bottom, and formed to be forced into the groove, the entrance of the ring into the groove causing the inclined outer wall to contract the ring and embed a part of its cylindrical surface in the continuous lip, thereby displacing the material of said continuous lip laterally toward the center of the bolt hole, and outwardly toward the outer face of the nut, while the cylindrical form of the wire reduces its bearing on the surface from which the bolt projects and on the inclined unyielding outer wall of the groove, and enables the ring to be forced into the groove with the minimum of frictional resistance.

In testimony whereof I have affixed my signature, in presence of two witnesses.

MILTON P. McLAUGHLIN.

Witnesses:
C. F. BROWN,
P. W. PEZZETTI.